United States Patent
Ishizuka

[11] Patent Number: 6,087,749
[45] Date of Patent: Jul. 11, 2000

[54] ROTARY POLYGONAL MIRROR DRIVING APPARATUS

[75] Inventor: Yutaka Ishizuka, Nagano, Japan

[73] Assignee: Sankyo Seiki Mfg. Co., Ltd., Nagano-ken, Japan

[21] Appl. No.: 09/219,282

[22] Filed: Dec. 22, 1998

[30] Foreign Application Priority Data

Dec. 26, 1997 [JP] Japan ................................. 9-359285

[51] Int. Cl.⁷ .................................................. H02K 5/00
[52] U.S. Cl. ............................................. 310/91; 384/100
[58] Field of Search ................................. 310/91, 90, 66; 74/572; 384/100

[56] References Cited

U.S. PATENT DOCUMENTS

| | | | |
|---|---|---|---|
| 3,936,682 | 2/1976 | Gates | 310/66 |
| 4,860,611 | 8/1989 | Flanagan et al. | 74/574 |
| 4,934,836 | 6/1990 | Tanaka et al. | 384/100 |
| 5,097,164 | 3/1992 | Nakasugi et al. | 310/88 |

FOREIGN PATENT DOCUMENTS 8-205452  9/1996  Japan .

*Primary Examiner*—Nestor Ramirez
*Assistant Examiner*—Joseph Waks
*Attorney, Agent, or Firm*—McAulay Nissen Goldberg & Kiel, LLP

[57] ABSTRACT

A rotary polygonal mirror driving apparatus comprises a rotor to which a driving magnet is attached, a stator disposed opposite to the driving magnet, a rotary polygonal mirror having a center hole through which a portion of the rotor is mounted so that it is mounted on a mirror mounting portion of the rotor and a cap is fixed to the rotor so that the rotary polygonal mirror is pushed in a thrust direction to be fixed onto the rotor. A top annular groove and a bottom annular groove concentric with the center hole are provided, which are cut in top and bottom surfaces in a mutually overlapping area radially further out than the mirror portion of the rotor.

11 Claims, 6 Drawing Sheets

ROTARY POLYGONAL MIRROR DRIVING APPARATUS

BACKGROUND OF THE INVENTION

1. Field of the Invention

The present invention relates to a rotary polygonal mirror driving apparatus used in laser printers as an optical deflecting device. More specifically, the present invention relates to a mounting structure of a rotary polygonal mirror to a rotor.

2. Description of the Related Art

A rotary polygonal mirror driving apparatus used in laser printers as an optical deflecting device, as disclosed in, for example, Tokkai H8-205452 comprises a rotor to which a driving magnet is attached, a stator disposed opposite the driving magnet, a rotary polygonal mirror having a center hole through which a portion of the rotor is inserted, and a mirror pressing member mounted to the rotor under the condition that the rotary polygonal mirror is pressed in the thrust direction.

In the rotary polygonal mirror configured in this manner, a thinly cut groove is provided along the chord of an annular top surface of a cylindrical portion (fitting protrusion) of the rotor which is fitted to the center hole (the fitting hole) of the rotary polygonal mirror, and the portion further out than the groove is made to be a elastically deforming portion. In the center of the groove on the top surface of the rotor, a screw hole is formed for screwing a screw that is used for fixing the mirror pressing member to the rotor. Therefore, even if the outer diameter of the fitting protrusion is small compared to the center hole of the rotary polygonal mirror, by screwing the mirror pressing engagement crew into the screw hole, the elastically deforming portion is widened outwardly, thus eliminating the gap between the elastically deforming portion and the inner circumferential surface of the center hole of the rotary polygonal mirror.

However, with the conventional mounting structure of the rotary polygonal mirror, if the force of tightening the screw is insufficient, a large centrifugal force is exerted on the rotary polygonal mirror rotating at high speed to expand it, widening the center hole and accordingly causing vibration in the rotary polygonal mirror. As a result, the rotary polygonal mirror is displaced on the rotor losing balance, and therefore, a great vibration is generated. On the other hand, if the screw (for widening the diameter) is tightened too much in order to firmly close the gap between the elastically deforming portion and the inner circumferential surface of the center hole of the rotary polygonal mirror even during the rotation, a large stress is applied to the inner circumferential surface of the center hole of the rotary polygonal mirror, possibly distorting a mirror surface formed on the outer circumference of the rotary polygonal mirror.

Considered may be a configuration in which the mirror pressing member elastically presses the rotary polygonal mirror in the thrust direction to fix it to the rotor, leaving the gap between the inner circumferential surface of the center hole of the rotary polygonal mirror and the outer circumferential surface of the rotor. With this configuration, there is no problem when the rotary polygonal mirror rotates at the speed of 10,000 turns per minute; however, when the polygonal mirror rotates at the high speed rotations of 37,000 per minute and repeats such high speed rotations and suspensions, the rotary polygonal mirror receives a large centrifugal force to expand and contract at the suspension. Consequently, a small displacement occurs in the rotary polygonal mirror at rotation, which cannot be found at the suspension, degrading optical polarizing performance.

OBJECT AND SUMMARY OF THE INVENTION

Considering the above problems, the primary object of the present invention is to provide a rotary polygonal driving apparatus in which the displacement of a rotary polygonal mirror on a rotor is certainly prevented even when the rotary polygonal mirror rotates at high speed.

In accordance with the invention, a rotary polygonal mirror driving apparatus comprises a rotor to which a driving magnet is attached, a stator disposed opposite to the driving magnet, a rotary polygonal mirror having a center hole through which a portion of the rotor is mounted so that it is mounted on a mirror mounting portion of the rotor and a cap is fixed to the rotor so that the rotary polygonal mirror is pushed in a thrust direction to be fixed onto the rotor. A top annular groove and a bottom annular groove concentric with the center hole are provided, which are cut in top and bottom surfaces in a mutually overlapping area radially further out than the mirror portion of the rotor.

DESCRIPTION OF THE PREFERRED EMBODIMENT

Figure 1:
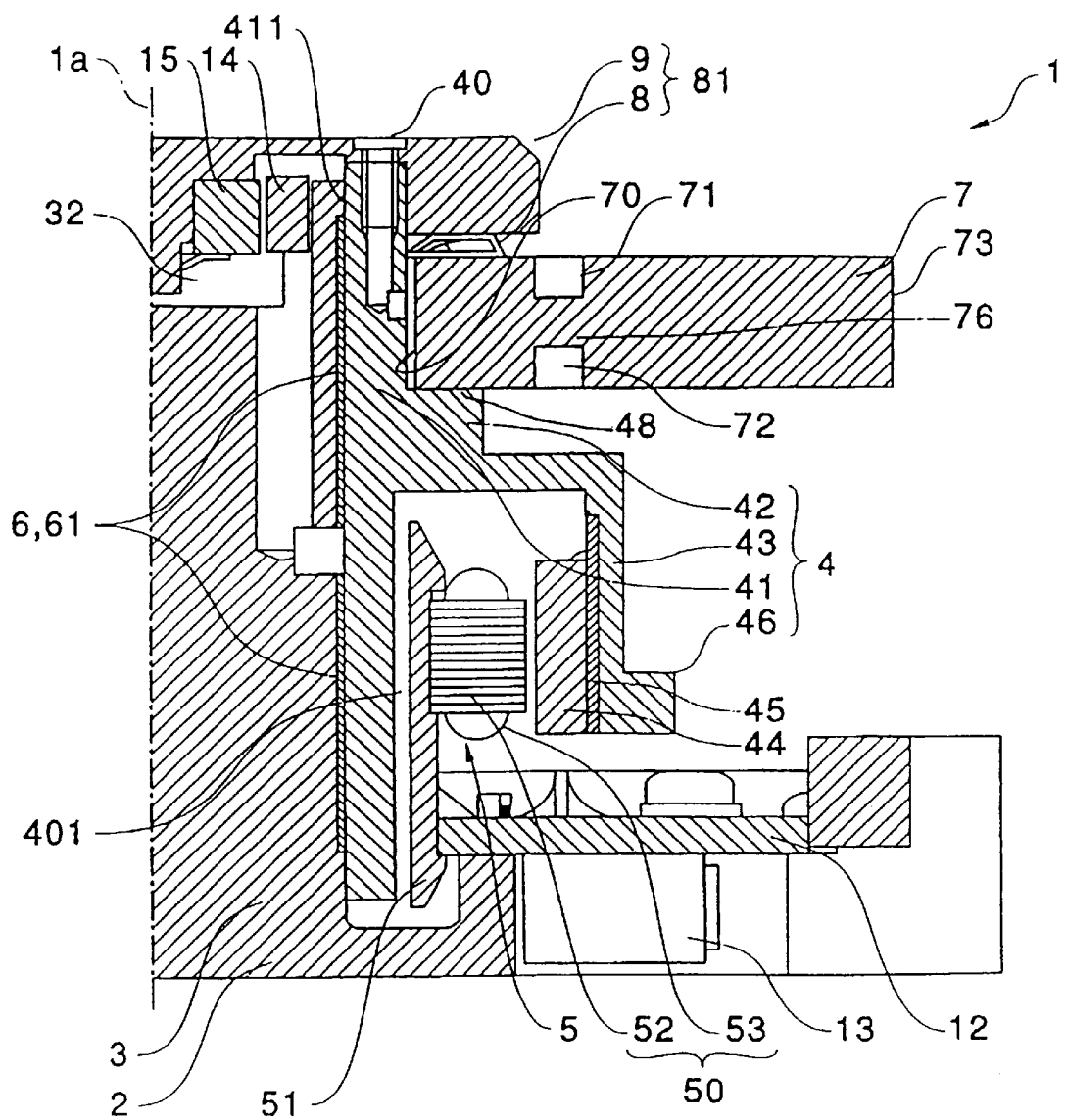
FIG. 1 shows a half cross-sectional view of a rotary polygonal mirror driving apparatus of Embodiment 1 of the present invention.

A rotary polygonal mirror driving apparatus to which the present invention is applied will be described referring to the drawings.

Embodiment 1 a) Overall configuration

FIG. 1 shows a half cross-sectional view of a rotary polygonal mirror driving apparatus (an optical deflecting device) of Embodiment 1 of the present invention. As illustrated in FIG. 1, an optical deflecting device 1 comprises a motor frame 2, a fixed shaft 3 standing upright at the motor frame 2, a rotor 4 rotatably supported by a hydrodynamic bearing 6 to an outer circumference of the fixed shaft 3, a stator 5 disposed opposite the rotor 4, and a rotary polygonal mirror 7 mounted to the rotor 4. The rotor 4 has a shaft hole 411 to which the fixed shaft 3 is inserted. The hydrodynamic bearing 6 has a herringbone-configured dynamic pressure generating groove 61 cut in the outer circumferential surface of the fixed shaft 3. When the rotor 4 rotates, a dynamic pressure is generated between the outer circumferential surface of the fixed shaft 3 and an inner circumferential surface of the shaft hole 411 so that the rotor 4 can rotate without resistance.

The stator 5 coaxially surrounds the fixed shaft 3 and has abcylindrical core holder 51 extending upright above the motor frame 2. A stator core 52 is mounted to an upper outer side surface of the core holder 51. A stator coil 53 is wound around a plurality of salient-poles formed in the stator core 52 in the radial direction with predetermined intervals to configure an armature 50.

The rotor 4 is made in a cup shape having an annular recess 401 open downwardly, inside which the stator 5 is arranged. A magnet yoke 45 is adhered to an inner circumferential surface of an outer side surface 43 of the rotor 4. Also, an annular driving magnet 44 is adhered to an inner circumferential surface of the magnet yoke 45 such that it coaxially surrounds the outer circumference of the stator core 52. The driving magnet 44 and the armature 50 are disposed opposite each another. Therefore, upon applying the current to the stator coil 53, the rotor 4 rotates to turn the rotary polygonal mirror 7 mounted to the rotor 4.

A motor substrate 12 is placed on the top surface of the motor frame 2 and below the stator core 52 and the driving magnet 44. Electronic components such as a connector 13, etc. are mounted on the top and bottom surface of the motor substrate 12.

A circular recess portion 32 is formed at a tip end portion of the fixed shaft 3, and an annular fixed magnet 14 is secured to the inner side surface thereof. Inside the fixed magnet 14, an annular rotary magnet 15 fixed to a cap 9 (to be described below) is located. Then, the magnetic center of the rotary magnet 15 in the axial line 1a direction is slightly shifted toward the fixed shaft 3 in the axial line 1a direction from the magnetic center of the fixed magnet 14 in the axial line 1a direction. In addition, since the fixed magnet 14 and the rotary magnet 15 face each other with the same poles, a thrust bearing is created by a magnetic repulsive force generated therebetween to prevent vibrations of the rotor 4 in the axial line 1a direction.

b) Configuration of Rotor 4

The rotor 4 is an aluminum alloy die-cast product and finished by machining. The rotor 4 has a cylindrical portion 41 including the shaft hole 411, an annular flange 42 projected perpendicularly toward the axial line 1a from the center position on the outer side surface of the cylindrical portion 41, and a cylindrical side portion 43 vertically bent at the outer periphery of the flange portion 42 along the axial line 1a toward the motor frame 2. With these components, the annular recess portion 401 for accommodating the armature 50 is formed in the rotor 4. The flange 42 constitutes a bottom wall of the annular recess portion 401, and the cylindrical portion 41 and side portion 43 constitute a side wall of the annular recess portion 401. Note that a projecting portion 46 projected circumferentially outward is formed at the opening edge of the side portion 43.

c) Mounting structure of Rotary Polygonal Mirror 7 to Rotor 4

A mirror mounting portion 48 for mounting the rotary polygonal mirror 7 is formed on a surface of the flange 42 opposite the annular recess portion 401, wherein the cylindrical portion 41 of the rotor 4 is fitted to a fitting hole 70 (center hole) formed in the center of the rotary polygonal mirror 7 to mount the rotary polygonal mirror 7 on the mounting portion 48. If an excessive stress is applied to the rotary polygonal mirror 7 when the cylindrical portion 41 of the rotor 4 is fitted to the fitting hole 70 of the rotary polygonal mirror 7, the rotary polygonal mirror 7 is distorted. Therefore, an appropriate clearance (gap) of, for example, 5 μm to 20 μm is provided between the fitting hole 70 of the rotary polygonal mirror 7 and the cylindrical portion 41 of the rotor 4. Note that, in this embodiment, the clearance formed between the fitting hole 70 of the rotary polygonal mirror 7 and the cylindrical portion 41 of the rotor 4 will not be filled with an adhesive and the like, but will remain as it is. With this condition, however, the rotary polygonal mirror 7 will be displaced on the rotor 4; therefore, a mirror pressing member 81 is provided to prevent this displacement.

In other words, the mirror pressing member 81 fixed to the rotor 4 elastically presses the rotor polygonal mirror 7 in the thrust direction to pressingly fix it to the rotor 4. In this embodiment, the mirror pressing member 81 includes a cap 9 arranged to cover the top surface of the rotary polygonal mirror 7 and an annular pressing spring 8 that is elastically deformed between the cap 9 and the top surface of the rotary polygonal mirror 7 by the thrust force from the cap 9. The cap 9 is first lightly press-fitted to an upwardly projecting portion of the cylindrical portion 41 of the rotor 4 above the rotary polygonal mirror 7, and then completely fixed to the rotor 4 with a screw 40. At this time, even if the mirror pressing member 81 pressingly fixes the rotary polygonal mirror 7 to the rotor 4 with a great strength, since the force of the mirror pressing member 81 exerts only in the thrust direction, the mirror surface 73 formed on the outer circumferential surface of the rotary polygonal mirror 7 -will never be distorted. Note that an elastic spacer may be used in place of the annular pressing spring 8.

In this embodiment, the rotor 4, cap 9, and rotary polygonal mirror 7 are all formed of materials having substantially the same linear expansion coefficient so that the fixing condition of the rotary polygonal mirror 7 to the rotor 4 with the mirror pressing member 81 is not changed by thermal deformation of each member caused by changes in temperature. Further, they are formed of an aluminum-copper alloy. Note that having substantially the same linear expansion coefficient means that the above members have the linear expansion coefficient of the range with which the fixing condition of the rotary polygonal mirror 7 to the rotor 4 will not be affected by thermal deformation caused by supposed changes in temperature.

Figure 2:
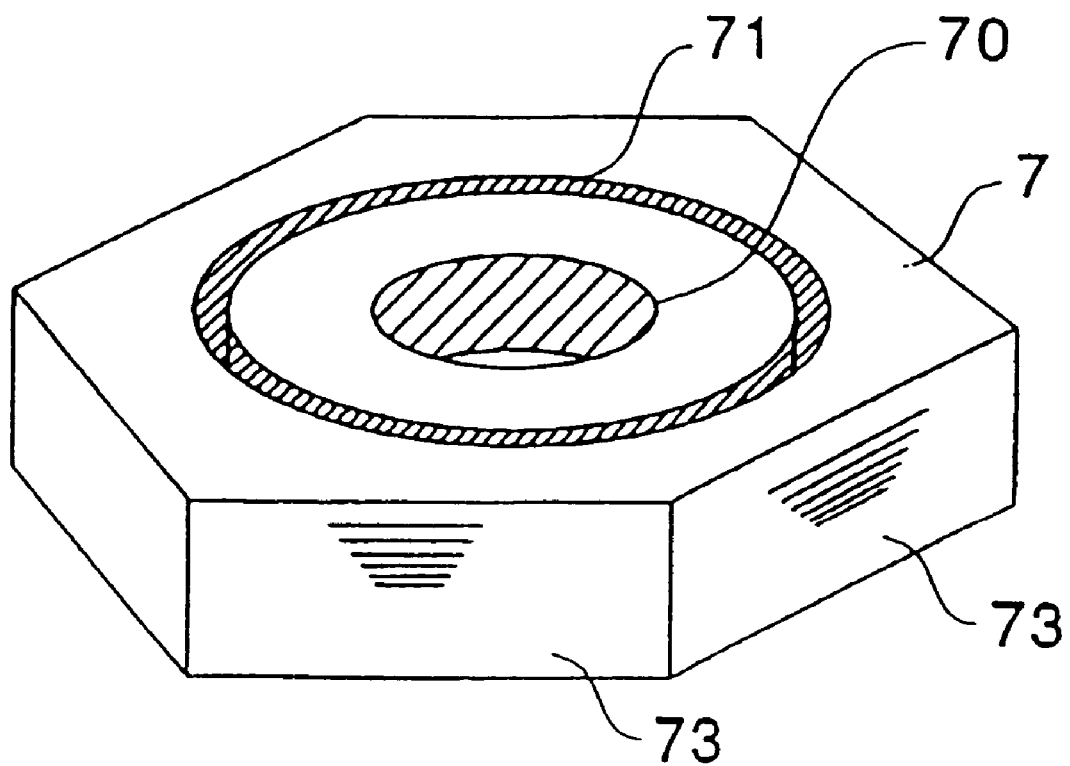
FIG. 2 is a perspective view of a rotary polygonal mirror used in the rotary polygonal mirror driving apparatus illustrated in FIG. 1.

Top and bottom annular grooves 71 and 72 concentric with the fitting hole 70 are cut on top and bottom surfaces of the rotary polygonal mirror 7 (see FIG. 2). The top and bottom annular grooves 71 and 72 are cut in the region radially further out than the mirror mounting portion 48 of the rotor 4. The top and bottom annular grooves 71 and 72 are provided at locations of the rotary polygonal mirror 7, which are equal in radius from the center, and also have the same groove width. Therefore, the top and bottom annular grooves 71 and 72 are overlapped at top and bottom of the rotary polygonal mirror 7. The portion 76 between the top and bottom annular grooves 71 and 72 is made to be thin. In addition, the groove depths of the top and bottom annular grooves 71 and 72 are also equal. Consequently, the top and bottom surfaces of the rotary polygonal mirror 7 are symmetrical. Thus, the rotary polygonal mirror 7 is in balance at the top and bottom, preventing surface vibrations thereon even at high speed rotations.

In rotary polygonal mirror driving apparatus 1 configured in the, above manner, the rotary polygonal mirror 7 has the thin portion 76 created with the top and bottom annular grooves 71 and 72 at the position circumferentially further out than the portion where the rotary polygonal mirror 7 is pressingly fixed to the rotor 4 by the cap 9 and pressing spring 8. Therefore, even when the rotary polygonal mirror 7 rotates at high speed of 37,000 turns per minute, only the thin portion 76 of the rotary polygonal mirror 7 expands with the large centrifugal force. Consequently, the thin portion 76 absorbs the centrifugal force generated when the rotary polygonal mirror 7 rotates at high speed, so that the portion circumferentially more inward than thin portion 76, at which the rotary polygonal mirror 7 is pressingly fixed to the mirror mounting portion 48 by the cap 9, will not be affected by the centrifugal force. In other words, even when the rotary polygonal mirror 7 is expanded and contrasted every time it rotates at high speed and suspends, such a deformation occurs only in the thin portion 76, but will not occur in the portion circumferentially inner than the thin portion, at which the rotary polygonal mirror 7 is pressingly fixed to the mirror mounting portion 48 by the cap 9. Thus, the rotary polygonal mirror 7 remain firmly fixed by the cap 9 onto the mirror mounting portion 48 of the rotor 4 that is located circumferentially inner than the thin portion 76, and will not be displaced on the rotor 4. Also with the same reason, even if the gap remains between the inner circumferential surface of the fitting hole 70 of the rotary polygonal mirror 7 and the outer circumferential surface of the rotor 4, the rotary polygonal mirror 7 rotating at high speed will not be a displaced on the rotor 4.

Embodiment 2

Figure 3:
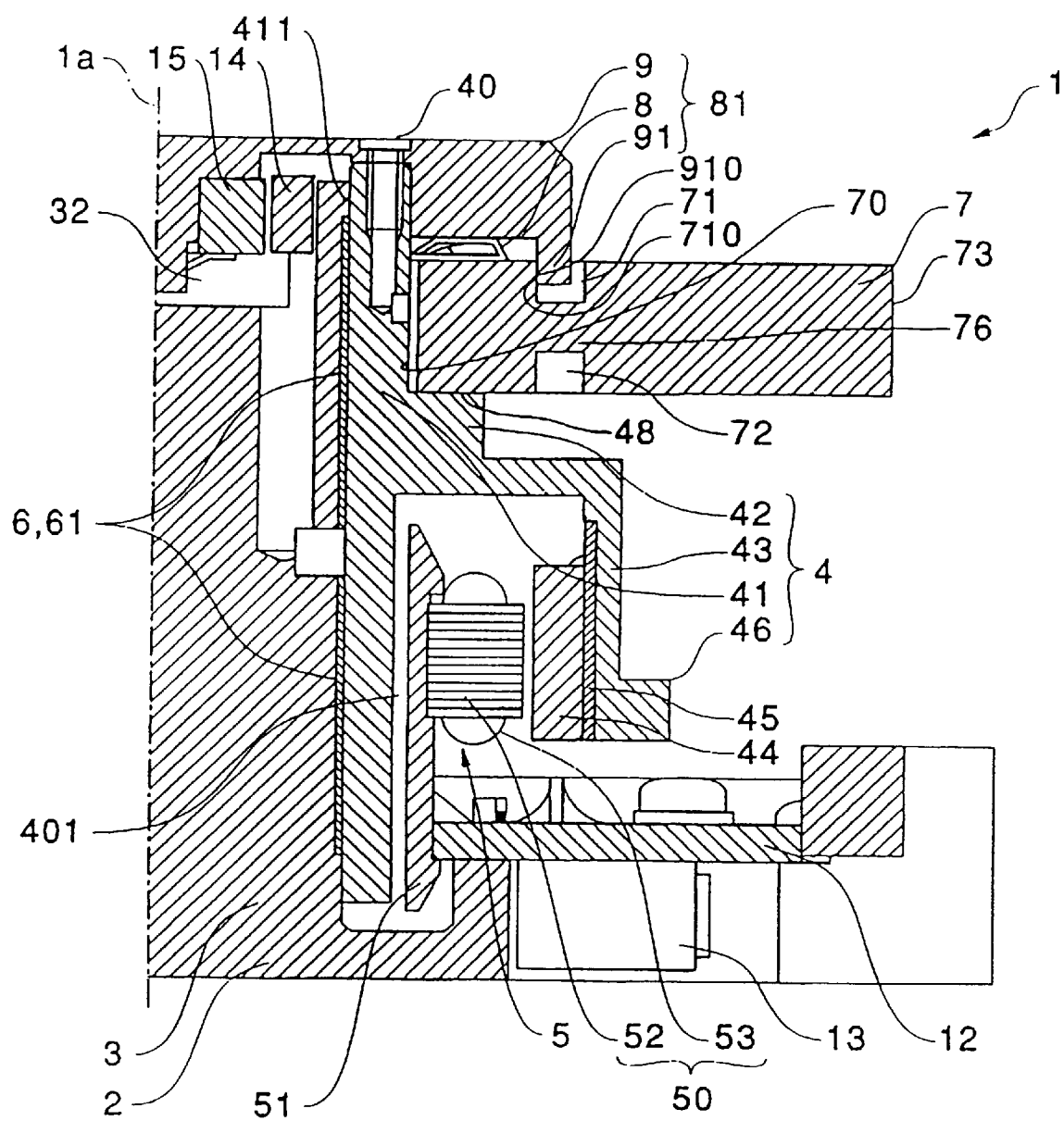
FIG. 3 shows a half cross-sectional view of a rotary polygonal mirror driving apparatus of Embodiment 2 of the present invention.

FIG. 3 shows a half cross-sectional view of a rotary polygonal mirror driving apparatus (an optical deflecting device) of Embodiment 2 of the present invention. Note that the rotary polygonal mirror driving apparatus (an optical deflecting device) of this embodiment is identical to Embodiment 1 in the basic configuration, and only the configuration for preventing the displacement of the rotary polygonal mirror on the rotor is different. Therefore, the identical element numbers are used in FIG. 3 for the elements having common functions, and the description for them is omitted.

In Embodiment 2, the top and bottom annular grooves 71 and 72 concentric with the fitting hole 70 are cut in the top and bottom surfaces of the rotary polygonal mirror 7 in the same manner as Embodiment 1. Therefore, the rotary polygonal mirror 7 is held in balance at top and bottom, and surface vibration thereof is prevented even at high speed rotations.

In this embodiment, the cap 9 has the outer diameter to cover the top annular groove 71. An annular engaging protrusion 91 (engaging protrusion of the cap) is projected from the outer periphery of the cap 9 to the rotary polygonal mirror 7, and engaged with the top annular groove 71. Further, an inner side surface 910 of the engaging protrusion 91 contacts an inner side wall 710 of the top annular groove 71.

In rotary polygonal mirror driving apparatus 1 configured in the above manner, even when the rotary polygonal mirror 7 repeats high speed rotations and suspensions, it is not displaced on the rotor 4 in the same manner as Embodiment 1.

Besides, since the engaging protrusion 91 of the cap 9 is engaged with the top annular groove 71 of the rotary polygonal mirror 7 and contacts the inner side wall 710 of the top annular groove 71, even when the rotary polygonal mirror 7 repeats expanding and contracting every time it repeats high speed rotations and suspensions, the position of the rotary polygonal mirror 7 is determined by the engagement between the top annular groove 71 and engaging protrusion 91. Therefore, the rotary polygonal mirror 7 is prevented from displacement with certainty.

Note that, although the top and bottom annular grooves 71 and 72 are cut in both top and bottom surfaces of the rotary polygonal mirror 7 and the engaging protrusion 91 of the cap 9 is engaged with the top annular groove 71 in Embodiment 2, the annular groove 71 may be formed only on the top surface and the engaging protrusion 91 of the cap 9 be engaged with the annular groove 71 to prevent the displacement of the rotary polygonal mirror 7 caused due to high speed rotations. When the annular groove 71 is formed only on the top surface of the rotary polygonal mirror 7 in this manner, the thickness at the grooved portion of the rotary polygonal mirror 7 can be obtained sufficiently, compared to the rotary polygonal mirror 7 having grooves on both surfaces. Therefore, unbalancing of the rotary polygonal mirror 7 during rotation is not a problem to which attention will be paid here.

Embodiment 3

Figure 4:
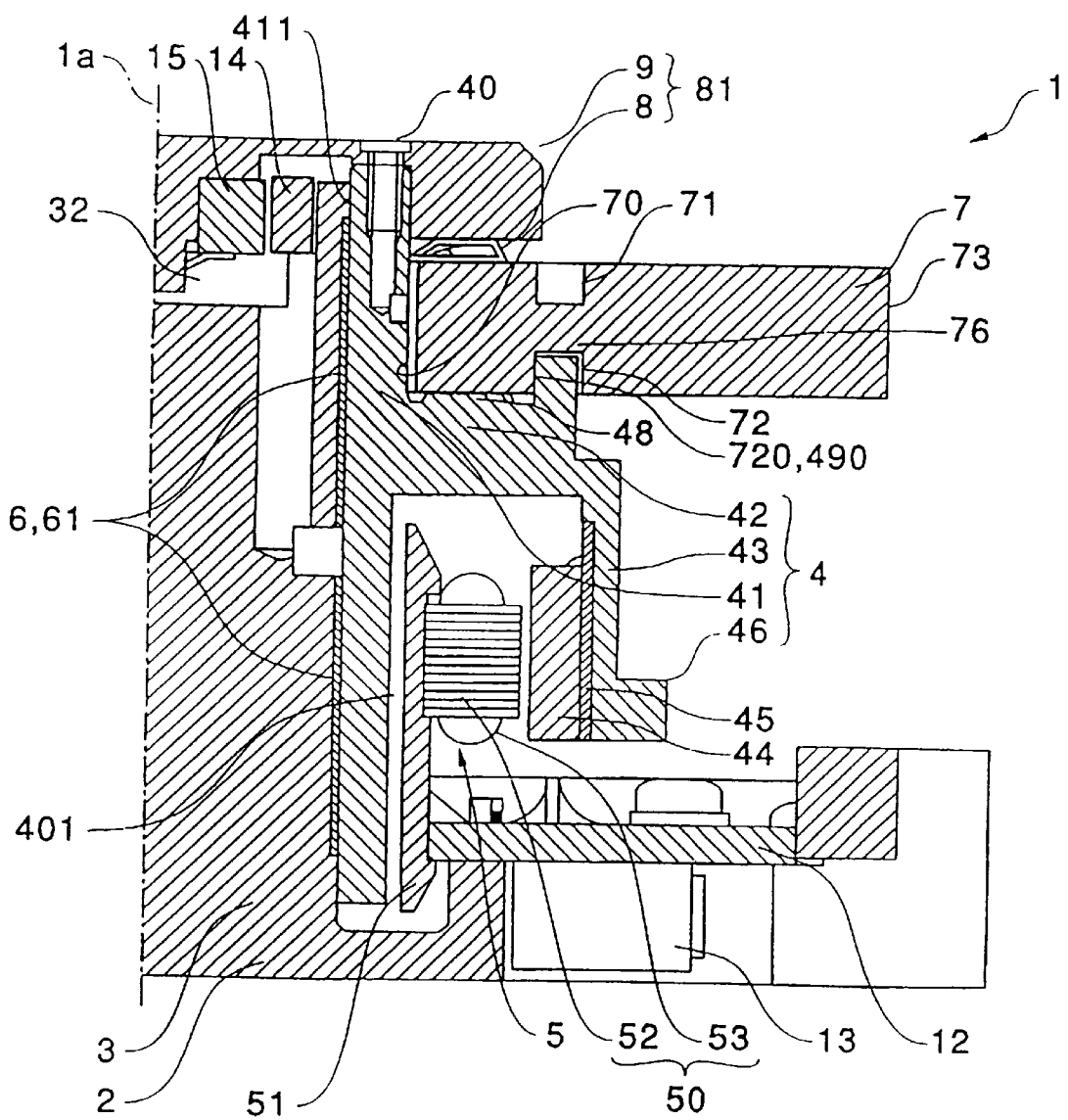
FIG. 4 shows a half cross-sectional view of a rotary polygonal mirror driving apparatus of Embodiment 3 of the present invention.

FIG. 4 shows a half cross-sectional view of a rotary polygonal mirror driving apparatus (an optical deflecting device) of Embodiment 3 of the present invention. Note that the rotary polygonal mirror driving apparatus (an optical deflecting device) of this embodiment is identical to Embodiments 1 and 2 in the basic configuration, but different only in the configuration for preventing displacement of the rotary polygonal mirror on the rotor. Therefore, the same element designations are used in FIG. 4 for the elements having common functions, and the description is omitted for them.

In Embodiment 3, different from Embodiment 2, an annular engaging protrusion (of rotor) is projected toward the rotary polygonal mirror 7 from the position circumferentially outer than the mirror mounting portion 48 of the rotor 4, and engaged with the bottom annular groove 72. Furthermore, an inner side surface 490 of the engaging protrusion 49 contacts the inner side wall 720 of the bottom annular groove 72.

In the rotary polygonal mirror driving apparatus 1 configured in the above manner, even when the rotary polygonal mirror 7 repeats high speed rotations and suspensions, it will not be displaced on the rotor 4 in the same manner as in Embodiment 1.

In addition, since the engaging protrusion 49 of the rotor 4 is engaged with the bottom annular groove 72 of the rotary polygonal mirror 7 and contacts the inner side wall 720 of the bottom annular groove 72, when the rotary polygonal mirror 7 repeats high speed rotations and suspensions and accordingly repeats expansions and contractions, the position of the rotary polygonal mirror 7 is determined by the bottom annular groove 72 and the engaging protrusion 49. Thus, the displacement of the rotary polygonal mirror 7 can be certainly prevented.

Note that, although the top and bottom annular grooves 71 and 72 are respectively cut in the top and bottom surfaces of the rotary polygonal mirror 7 to engage the engaging protrusion 49 of the rotor 4 with the bottom annular groove 72 in Embodiment 3, the annular groove 72 may be formed only on the bottom surface to engage the engaging protrusion 49 of the rotor 4 therewith. In this manner, the displacement of the rotary polygonal mirror 7 caused due to high speed rotations can be prevented. When the annular groove 72 is cut only in the bottom surface of the rotary polygonal mirror 7 in this manner, the thickness at the groove portion of the rotary do polygonal mirror 7 can be obtained sufficiently, compared to the rotary polygonal mirror 7 having the grooves on both surfaces. Therefore, unbalancing of the rotary polygonal mirror 7 during rotation is not a problem.

Further Embodiments

In Embodiments 2 and 3, either the annular engaging protrusion 91 of the cap 9 or the annular engaging protrusion 49 of the rotor 4 is engaged with one of the annular grooves, the top or bottom annular grooves 71 or 72, of the rotary polygonal mirror 7. However, the engaging protrusion 91 of the cap 9 and the engaging protrusion 49 of the rotor 4 may be respectively engaged with the top and bottom annular grooves 71 and 72 of the rotary polygonal mirror 7.

Figure 5A:
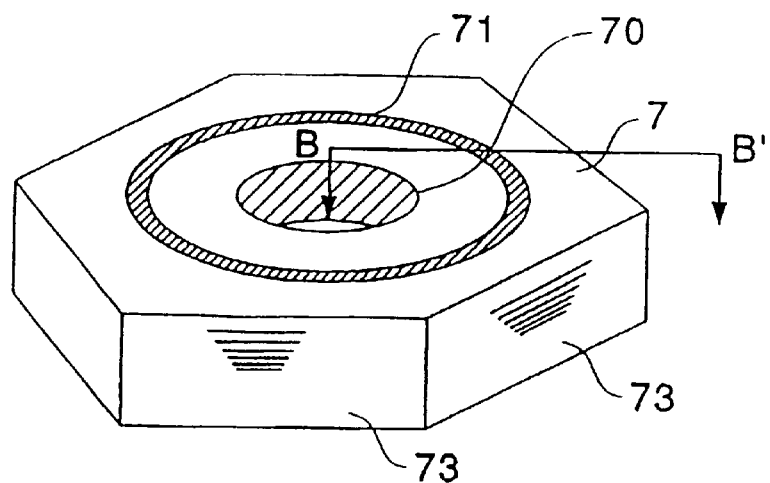
FIG. 5(A) is a perspective view of a rotary polygonal mirror usable in the rotary polygonal mirror driving apparatus to which the present invention is applied; FIG. (B) is a B–B' cross-sectional view showing a shape of the annular groove cut in the rotary polygonal mirror.
Figure 5B:
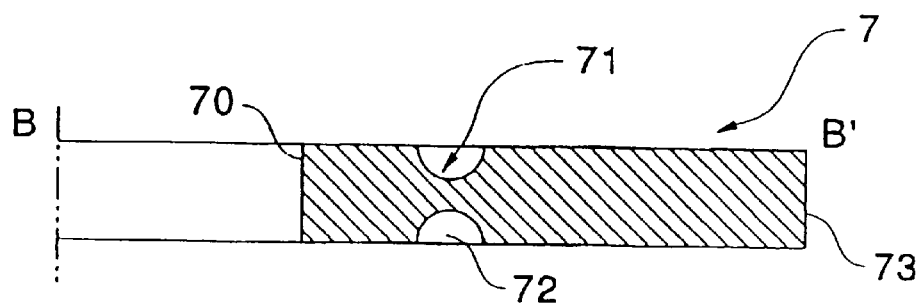

Although the top and bottom annular grooves 71 and 72 of the rotary polygonal mirror 7 are rectangular in cross-section in Embodiments 1, 2, and 3, they may be of U-shape in cross-section as illustrated in FIGS. 5(A) and (B).

Figure 6A:
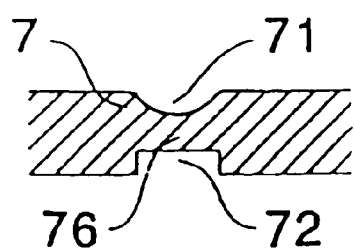
FIGS. 6(A), (B), (C), and (D) respectively show cross-sectional views of various shapes of the annular groove cut in the rotary polygonal mirror of the rotary polygonal mirror driving apparatus to which the present invention is applied.
Figure 6B:
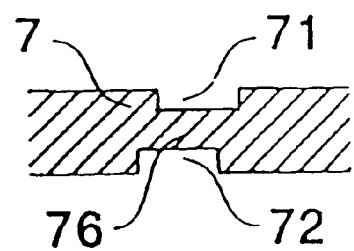
Figure 6C:
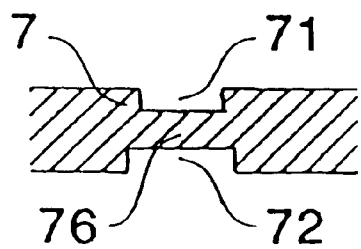
Figure 6D:
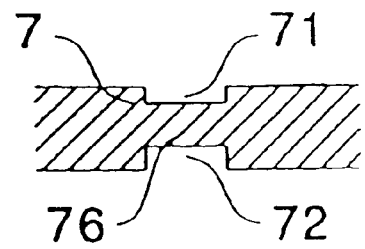

Although the top and bottom annular grooves 71 and 72 formed in the rotary polygonal mirror 7 are both rectangular in cross-section and identical in the groove width and depth in Embodiments 2 and 3, they may be formed different in the shape, forming position, groove width, and groove depth, as illustrated in FIGS. 6(A), (B), (C), and (D), as long as surface vibrations do not occur in the rotary polygonal mirror 7 even at high speed rotations. For example, in the rotary polygonal mirror 7 illustrated in FIG. 6(A), one of the annular grooves, the top or bottom annular grooves 71 or 72, is in the U-shape in cross-section, and the other is rectangular. In the rotary polygonal mirror 7 illustrated in FIG. 6(B), while the top and bottom annular grooves 71 and 72 are identical in the groove width and depth, the forming regions thereof are shifted so that the top and bottom annular grooves 71 and 72 are only partially overlapped. In the rotary polygonal mirror 7 illustrated in FIG. 6(C), the top and bottom annular grooves 71 and 72 are identical in the groove depth, but the groove widths thereof are different. Therefore, the top and bottom annular grooves 71 and 72 are only partially overlapped. In the rotary polygonal mirror 7 illustrated in FIG. 6(D), the top and bottom annular grooves 71 and 72 are identical in the groove width, but different in the groove depth. In the rotary polygonal mirror 7 having either configuration mentioned above, since the thin potion 76 is formed with the top and bottom annular grooves 71 and 72, the centrifugal force generated when the rotary polygonal mirror 7 rotates at high speed is absorbed in the thin portion 76 so that the force will not affect further inner side. Consequently, even when the rotary polygonal mirror 7 rotates at high speed, it will not be displaced on the rotor 4.

Note that, in the rotary polygonal mirror 7 having either configuration illustrated in FIG. 6(A), (B), (C), or (D), the annular engaging protrusion 91 of the cap 9 or the annular engaging protrusion 49 of the rotor 4 is engaged with either one of or both of the annular grooves, the top and bottom annular grooves 71 and 72, of the rotary polygonal mirror 7. In this manner, even when the rotary polygonal mirror 7 repeats high speed rotations and suspensions and accordingly expansions and contractions, the position of the rotary polygonal mirror 7 may be determined by the engagement between the top annular groove 71 and the engaging protrusion 91 or that between the bottom annular groove 72 and the engaging protrusion 49 to prevent the displacement of the rotary polygonal mirror 7.

With such a configuration, the engaging protrusion 91 of the cap 9 or the engaging portion 49 of the rotor 4 is engaged with the top annular groove 71 or the bottom annular groove 72 of the rotary polygonal mirror 7. Also, it is configured such that the engaging protrusion 91, 49 contacts the inner side wall 710, 720 of the top or bottom annular groove 71, 72. If the engaging protrusion 91 of the cap 9 or the engaging protrusion 41 of the rotor 4 is adhered to the inner side wall 710, 720 of the top or bottom annular groove 71, 72 with an epoxy resin-type adhesive, even when the rotary polygonal mirror 7 expands and contracts, the position of the rotary polygonal mirror 7 is fixed with certainty, thus preventing the displacement of the rotary polygonal mirror 7.

All the embodiments have been described in a circumferentially facing-type motor in which the driving magnet faces the stator in the radial direction. However, the present invention can be applied to a surface-facing-type motor in which the driving magnet faces the stator in the thrust direction. In addition, the present invention can be applied not only to fixed-shaft-type motors, but also to rotary-shaft-type motors.

As described above, in the rotary polygonal mirror driving apparatus of the present invention, the mirror pressing member pressingly fixed the rotary polygonal mirror to the rotor; therefore, the rotary polygonal mirror on the rotor can be prevented from being displaced. Also, since the force of the mirror pressing member is exerted in the thrust direction, the mirror surface on the outer circumferential surface of the rotary polygonal mirror will not be distorted. In the rotary polygonal mirror, the region for forming the top and bottom annular grooves is made thin; therefore, even when the rotary polygonal mirror rotates at high speed of 37,000 turns per minute, only the thin portion of the rotary polygonal mirror expands with the large centrifugal force. Accordingly, the centrifugal force will not affect the portion circumferentially inner than the thin portion, at which the rotary polygonal mirror is pressingly fixed to the mirror mounting portion by the cap. Therefore, even when the rotary polygonal mirror repeats high speed rotations and suspensions, it will not be displaced on the rotor.

Therefore, even if the gap is provided between the inner circumferential surface of the center hole of the rotary polygonal mirror and the outer circumferential surface of the rotor so that a large stress will not be applied to the rotary polygonal mirror when fitting a portion of the rotor into the center hole of the rotary polygonal mirror, the displacement of the rotary polygonal mirror due to the gap will not occur because the portion more circumferentially inward than the thin portion is not affected by the force generated when the rotary polygonal mirror rotates at high speed.

Also, the engaging protrusion to be engaged with either the top or bottom annular groove is formed at the cap or the rotor so that the position of the rotary polygonal mirror is determined by the engagement between the annular groove and the engaging protrusion. Thus, the displacement of the rotary polygonal mirror can be prevented with certainty.

In the present invention, it is preferred that the top and bottom annular grooves be identical in the groove (opening) width and depth. In other words, it is preferred that the balance be maintained in the rotary polygonal mirror without generating surface vibrations at high speed rotations by maintaining the symmetry of the top and bottom sides when the top and bottom annular grooves are formed in the rotary polygonal mirror.

In the present invention, it is preferred that the cap has the engaging protrusion which is projected toward the rotary polygonal mirror, engaged with the top annular groove, and contacts at least the inner side wall of the top annular groove. It is preferred that the rotor has the engaging protrusion which is projected toward the rotary polygonal mirror, engaged with the bottom annular groove, and contacts at least the inner side wall of the bottom annular groove. In this case, it is preferred that the engaging protrusions be adhered to the inner side walls of the annular grooves by an adhesive.

With the above configuration, even when the rotary polygonal mirror repeats high speed rotations and suspensions and accordingly repeats expansions and contractions, since the position of the rotary polygonal mirror is determined by the engagement between the annular groove and the engaging protrusion, the displacement of the rotary polygonal mirror can be prevented with certainty.

While the foregoing descriptions and drawings represent the preferred embodiments of the present invention, it will be obvious to those skilled in the art that various changes and modifications may be made therein without departing from the true spirit and scope of the present invention.

What is claimed is:

1. A rotary polygonal mirror driving apparatus comprising:
    a rotor to which a driving magnet is attached;
    a stator disposed opposite said driving magnet;
    a rotary polygonal mirror having a center hole through which a portion of said rotor is inserted so that it is mounted on a mirror mounting portion of said rotor;
    a cap fixed to said rotor so that said rotary polygonal mirror is pushed in a thrust direction to be fixed onto said rotor;
    and a top annular groove and a bottom annular groove concentric with said center hole, which are cut in top and bottom surfaces in a mutually overlapping area radially further out than said mirror mounting portion of said rotor;
    and wherein said cap has an engaging protrusion projected toward said rotary polygonal mirror and engaging with said top annular groove, said engaging protrusion contacting at least an inner side wall of said top annular groove.

2. The rotary polygonal mirror driving apparatus as set forth in claim 1 wherein said engaging protrusion of said cap is adhered by an adhesive to at least said inner side wall of said top annular groove.

3. A rotary polygonal mirror driving apparatus comprising:
    a rotor to which a driving magnet is attached;
    a stator disposed opposite said driving magnet;
    a rotary polygonal mirror having a center hole through which a portion of said rotor is inserted so that it is mounted on a mirror mounting portion of said rotor;
    a cap fixed to said rotor so that said rotary polygonal mirror is pushed in a thrust direction to be fixed onto said rotor;
    and a top annular groove and a bottom annular groove concentric with said center hole, which are cut in top and bottom surfaces in a mutually overlapping area radially further out than said mirror mounting portion of said rotor;
    and wherein said rotor has an engaging protrusion projected toward said rotary polygonal mirror and engaging with said bottom annular groove, said engaging protrusion contacting at least an inner side wall of said bottom annular groove.

4. The rotary polygonal mirror driving apparatus as set forth in claim 3 wherein said engaging protrusion of said rotor is adhered by an adhesive to at least said inner side wall of said bottom annular groove.

5. A rotary polygonal mirror driving apparatus comprising:
    a rotor to which a driving magnet is attached;
    a stator disposed opposite said driving magnet;
    a rotary polygonal mirror having a center hole through which a portion of said rotor is inserted so that it is mounted on a mirror mounting portion of said rotor;
    a cap fixed to said rotor so that said rotary polygonal mirror is pushed in a thrust direction to be fixed onto said rotor;
    and a top annular groove and a bottom annular groove concentric with said center hole, which are cut in top and bottom surfaces in a mutually overlapping area radially further out than said mirror mounting portion of said rotor;
    and wherein a holding spring, which is elastically deformed by a force from said cap in a thrust direction, is provided between said cap and said rotary polygonal mirror.

6. The rotary polygonal mirror driving apparatus as set forth in claim 1 or claim 3 or claim 5 wherein said rotary polygonal mirror is mounted on said rotor interposing a gap between an inner circumferential surface of said center hole and an outer circumferential surface of an insertion path of said rotor.

7. The rotary polygonal mirror driving apparatus as set forth in claim 1 or claim 3 or claim 5 wherein said top annular groove and said bottom annular groove are identical in said groove width and depth.

8. The rotary polygonal mirror driving apparatus as set forth in claim 1 or claim 3 or claim 5 wherein said rotor is supported by a hydrodynamic bearing.

9. The polygonal mirror driving apparatus as set forth in claim 1 or claim 3 or claim 5 wherein said rotor is supported by a hydrodynamic bearing and has a shaft, a herringbone-configured hydrodynamic groove being cut on an outer circumferential surface of a fixed shaft to be inserted to said shaft hole, and wherein said hydrodynamic bearing is formed with said outer circumferential surface of said fixed shaft and an inner circumferential surface of said shaft hole of said rotor to support said rotor.

10. A rotary polygonal mirror driving apparatus comprising:
    a rotor to which a driving magnet is attached;
    a stator disposed opposite said driving magnet;
    a rotary polygonal mirror having a center hole through which a portion of said rotor is inserted so that it is mounted on a mirror mounting portion of said rotor;
    a cap fixed to said rotor so that said rotary polygonal mirror is pressed in the thrust direction to be fixed onto said rotor;
    a top annular groove concentric with said center hole, which is cut in a top surface of said rotary polygonal mirror in an area radially further out than said mirror mounting portion of said rotor;
    and an engaging protrusion formed at said cap, projected toward said rotary polygonal mirror, engaging with said top annular groove, and contacting an inner side wall of said top annular groove.

11. A rotary polygonal mirror driving apparatus comprising:
    a rotor to which a driving magnet is attached;
    a stator disposed opposite said driving magnet;
    a rotary polygonal mirror having a center hole through which a portion of said rotor is inserted so that it is mounted on a mirror mounting portion of said rotor;
    a cap fixed to said rotor so that said rotary polygonal mirror is pressed in the thrust direction to be fixed onto said rotor;

a bottom annular groove concentric with said center hole, which is cut in the bottom surface of said rotary polygonal mirror in an area radially further out than said mirror mounting portion of said rotor;

and an engaging protrusion formed at said rotor, projected toward said rotary polygonal mirror, engaging with said bottom annular groove, and contacting an inner side wall of said bottom annular groove.

* * * * *